United States Patent [19]
Kim

[11] Patent Number: 5,943,099
[45] Date of Patent: Aug. 24, 1999

[54] INTERLACED-TO-PROGRESSIVE CONVERSION APPARATUS AND METHOD USING MOTION AND SPATIAL CORRELATION

[75] Inventor: Young-taek Kim, Suwon, Rep. of Korea

[73] Assignee: Samsung Electronics Co., Ltd., Suwon, Rep. of Korea

[21] Appl. No.: 08/787,078

[22] Filed: Jan. 22, 1997

[30] Foreign Application Priority Data

Jan. 27, 1996 [KR] Rep. of Korea .......................... 96-1795

[51] Int. Cl.$^6$ ...................................................... H04N 7/01
[52] U.S. Cl. ............................................. 348/448; 348/452
[58] Field of Search ..................... 348/448, 452, 348/607, 616, 618, 619, 620, 447, 450, 451; 382/229; H04N 5/21, 5/213, 7/01

[56] References Cited

FOREIGN PATENT DOCUMENTS

| 2-166889 | 6/1990 | Japan | H04N 7/01 |
| 4-35485 | 2/1992 | Japan | H04N 7/01 |

*Primary Examiner*—David E. Harvey
*Attorney, Agent, or Firm*—Staas & Halsey

[57] ABSTRACT

An interlaced-to-progressive conversion device includes a spatial interpolator for spatially interpolating an input interlaced image signal and outputting a spatially interpolated signal; a temporal interpolator for temporally interpolating the input interlaced image signal and outputting a temporally interpolated signal; a correlator for detecting a motion correlation, a vertical correlation, and a temporal-vertical correlation by using a predetermined number of sample data in a current field, a previous field and a next field; and a selector for comparing the motion correlation, the vertical correlation, and the temporal-vertical correlation with respective predetermined constants and selecting between one of the spatially interpolated signal and the temporally interpolated signal according to the results of the comparisons. The interlaced-to-progressive conversion device enhances the reliability of information of the motion and efficiently reduces an artifact by temporally or spatially interpolating an interlaced image signal using motion and spatial correlations.

20 Claims, 4 Drawing Sheets

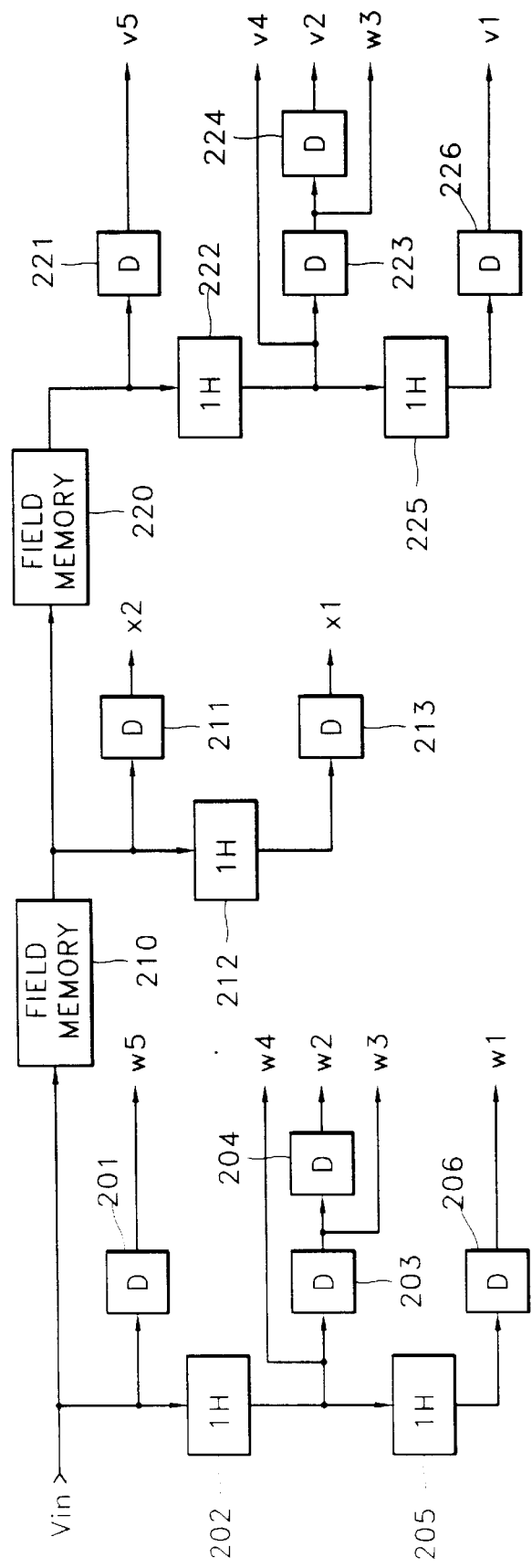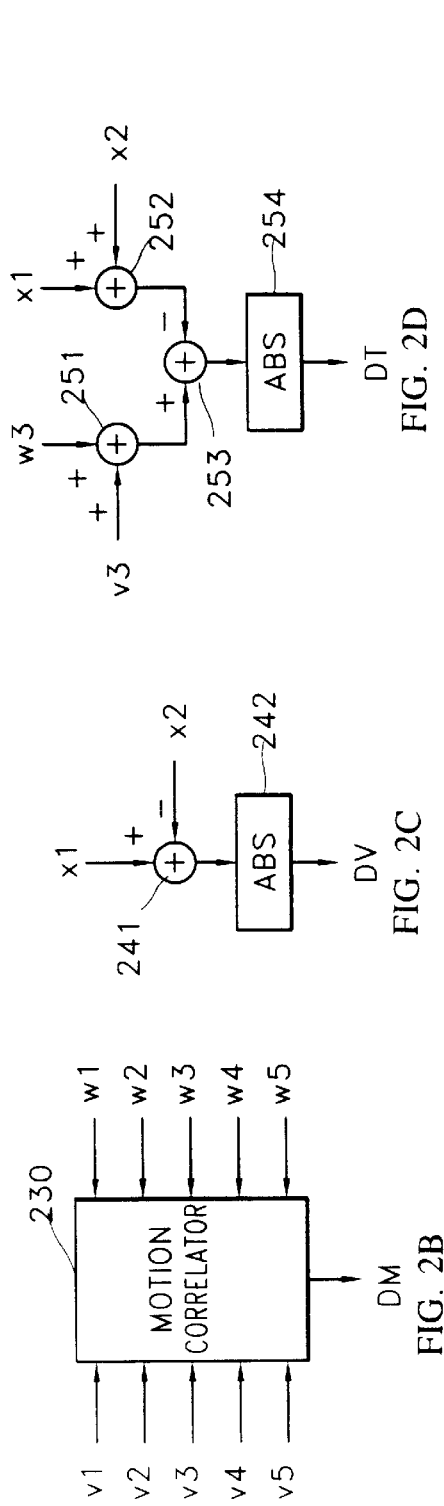
FIG. 2A
FIG. 2B
FIG. 2C
FIG. 2D

INTERLACED-TO-PROGRESSIVE CONVERSION APPARATUS AND METHOD USING MOTION AND SPATIAL CORRELATION

BACKGROUND OF THE INVENTION

1. Field of the Invention

The present invention relates to an interlaced-to-progressive conversion apparatus and method using motion and spatial correlation. More particularly, the present invention relates to an apparatus and method for converting an interlaced image signal into a progressive image signal by interpolating spatially or temporally depending on motion and spatial correlations.

2. Description of the Related Art

Generally, an interlaced-to-progressive conversion (IPC) device has widely been used for reducing many artifacts due to interlaced scanning, namely, deterioration of vertical resolution, flickering of a scanning line, and the flickering of a wide area in systems such as NTSC, PAL, SECAM, etc.

Recently, the interlaced-to-progressive conversion apparatus has become more important since a high definition (resolution) television (HDTV) system adopts a plurality of standards on signal formats and the conversion among standard input/output signals of various formats is required frequently.

The interlaced to progressive conversion algorithm which have been developed in an early stage was intended for systems such as NTSC, PAL, SECAM, etc. Various algorithms which have been proposed are commonly based on an interpolation for reproducing the lines which are excluded in the interlaced scanning.

An algorithm proposed to reduce such artifacts, an interpolating method according to a simple line doubling, vertical filtering, and a method based on vertical edge information are disclosed in a first reference: D. I. C. Hentschei, "Comparison Of Median Filtering and Vertical Edge Controlled Interpolator for Flicker Reduction," IEEE Trans. on Consumer Electronics, vol. 35, no. 3, pp. 279–289, August 1989.

An interpolating method according to an edge direction is disclosed in a second reference: D. Bagni, R. Lancini, S. Landi, and S. Tubaro, "HD-TV Spatio-temporal Upconversion," Proc. of the Int. Workshop on HDTV, 1994.

A non-linear high-speed interpolating method based on a weighted median filter is disclosed in a third reference: J. Juhola, A. Nieminen, J. Salo, and Y. Neuvo, "Scan Rate Conversion Using Weighted Median Filtering," Proc. IEEE ISCAS-89, Portland, USA, May 1989, pp. 433–436.

An algorithm based on an FIR median hybrid filter is disclosed in a fourth reference: A. Lehtonen and M. Renfors, "Non-linear Quincunx Interpolation Filtering," Proc. SPIE's Visual Communication and Image Processing, Lausanne, Switzerland, October 1990, pp. 132–135.

An algorithm based on a complementary median filter is disclosed in a fifth reference: H. Blume, L. Schwoerer, and K. Zygis, "Subband Based Upconversion Using Complementary Median Filter," Proc. of the Int. Workshop on HDTV, 1994.

An algorithm based on median filtering according to a direction is disclosed in a sixth reference: T. Doyle, "Interlaced to Sequential Conversion for EDTV Applications," pp. 421–430, Signal Processing of HDTV, L. Chiariglione Ed., Elsevier Science Publishers, North Holland, 1988.

Algorithms based on a vertical-temporal median filter are disclosed in seventh and eighth references: P. Frenchen, "Two Integrated Progressive Scan Converters," IEEE Trans on Consumer Electronics, vol. 32, no. 3, pp. 237–240, 1986; and T. Doyle and P. Frencken, "Median Filtering of Television Images," IEEE Digest of Technical Papers, pp. 186–187, 1986.

Also, motion adaptive schemes are disclosed in ninth and tenth references: N. Suzuki and et al, "Improved Synthetic Motion Signal For Perfect Motion-Adaptive Pro-Scan Conversion in IDTV Receivers," IEEE Trans. on Consumer Electronics, vol 33, no. 3, pp. 266–271, August 1989; and C. P. Markhauser, "Motion Adaptive Pro-Scan Converter with Two Dimensional Contour Enhancement," IEEE Trans. on Consumer Electronics, vol. 36, no. 2, pp. 110–114, May 1990.

The above interlaced-to-progressive conversion methods can roughly be categorized into a spatial-interpolating method, a temporal-interpolating method, and a three-dimensional interpolating method which combines the spatial-interpolation and the temporal-interpolation.

In the three-dimensional interpolating method, it is important to detect a motion in the image and carry out a temporal-interpolation appropriately on the basis of the detected motion since a wrong temporal-interpolation can cause deterioration of picture quality, such as a tearing-artifact. This is due to the fact that the maximum temporal frequency which can be determined theoretically is limited since a temporal sampling rate is smaller than a Nyquist rate in a real image signal.

However, it is possible to enhance the reliability of motion information by using the spatial information of a sample along with the motion information together, as proposed in the present invention.

SUMMARY OF THE INVENTION

It is an object of the present invention to provide an interlaced-to-progressive conversion device for converting an interlaced image signal to a progressive image signal by performing a spatial-interpolation or a temporal-interpolation depending on motion and spatial correlations.

It is another object of the present invention to provide a three-dimensional interlaced-to-progressive conversion method for selecting and outputting one of a spatial-interpolated and a temporal-interpolated image signal depending on motion and spatial correlations.

To achieve the above and other objects, there is provided an interlaced-to-progressive conversion device for converting an input interlaced image signal to a progressive image signal, comprising spatial interpolating means for spatially interpolating the input interlaced image signal and outputting a spatially interpolated signal; temporal interpolating means for temporally interpolating the input interlaced image signal and outputting a temporally interpolated signal; correlating means for receiving the input interlaced image signal and outputting a motion correlation, a vertical correlation, and a temporal-vertical correlation by using a predetermined number of sample data in a current field, a previous field and a next field; and selecting means for comparing the motion correlation, the vertical correlation, and the temporal-vertical correlation with respective predetermined constants and selecting between one of the spatially interpolated signal and the temporally interpolated signal according to the results of the comparisons.

Further, to achieve the above and other objects, there is provided an interlaced-to-progressive conversion method for converting an input interlaced image signal to a progressive image signal, comprising the steps of (a) spatially interpolating the input interlaced image signal and outputting a spatially interpolated signal; (b) temporally interpolating the input interlaced image signal and outputting a temporally interpolated signal; (c) detecting a motion correlation, a vertical correlation, and a temporal-vertical correlation from the input interlaced image signal; (d) selecting the spatially interpolated signal if the detected motion correlation value is greater than a first predetermined constant; (e) selecting the temporally interpolated signal if the motion correlation value is not greater than the first predetermined constant and the detected vertical correlation value is greater than a second predetermined constant; (f) selecting the spatially interpolated signal if the motion correlation value is not greater than the first predetermined constant and the vertical correlation value is not greater than the second predetermined constant and the detected temporal-vertical correlation value is greater than a third predetermined constant; and (g) selecting the temporally interpolated signal if the motion correlation value is not greater than the first predetermined constant and the vertical correlation value is not greater than the second predetermined constant and the temporal-vertical correlation value is not greater than the third predetermined constant.

BRIEF DESCRIPTION OF THE DRAWINGS

The above and other objects and advantages of the present invention will become more apparent by describing in detail a preferred embodiment thereof with reference to the attached drawings in which:

FIGS. 2A through 2D are detailed block diagrams of a motion-space correlator shown in FIG. 1;

DETAILED DESCRIPTION OF THE INVENTION

Hereinafter, an interlaced-to-progressive conversion device and method using a correlation of motion and space and a preferred embodiment thereof are described with reference to the attached drawings.

Figure 1:
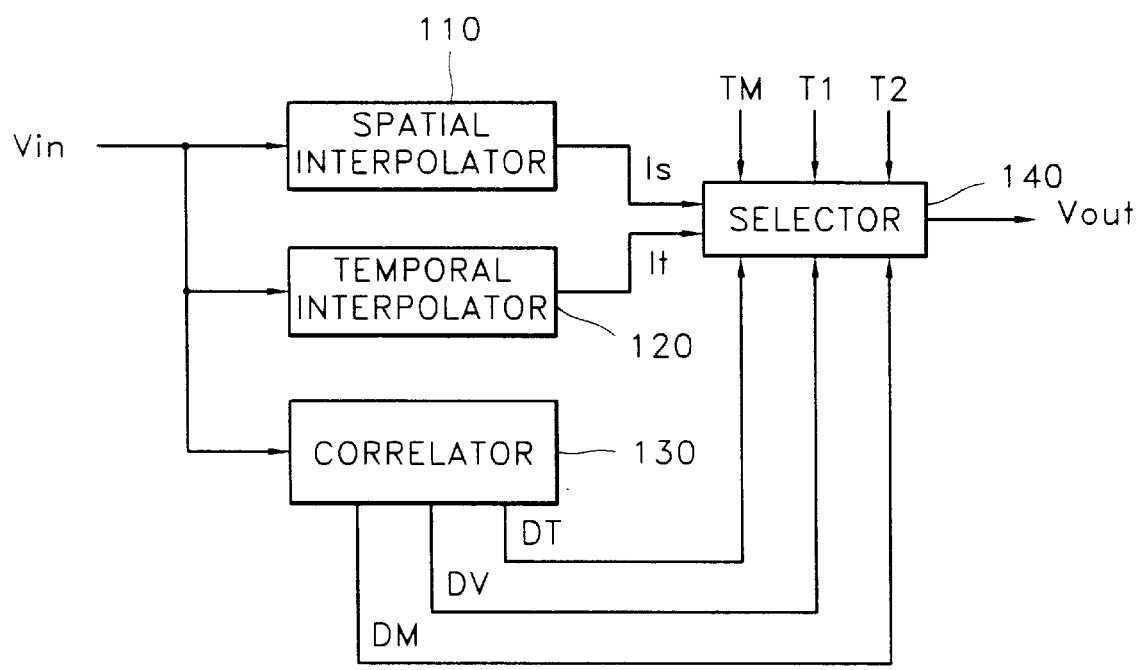
FIG. 1 is a block diagram of an embodiment of an interlaced-to-progressive conversion device according to the prevent invention.

FIG. 1 is a block diagram of an embodiment of the interlaced-to-progressive conversion device according to the present invention.

The interlaced-to-progressive conversion device includes a spatial interpolator 110, a temporal interpolator 120, a correlator 130, and a selector 140.

The spatial interpolator 110 spatially interpolates an input interlaced image signal Vin by using a predetermined algorithm.

The temporal interpolator 120 temporally interpolates the input interlaced image signal Vin by using a predetermined algorithm.

The correlator 130 detects a motion correlation DM, a vertical direction correlation DV, and a correlation between the temporal interpolation and a vertical interpolation (which is referred to as "temporal-vertical correlation", hereinafter) DT from the input interlaced image signal.

The selector 140 compares the motion correlation DM, the vertical correlation DV, and the temporal-vertical correlation DT with predetermined constants TM, T1, and T2, respectively, and selects a signal Is output by the spatial interpolator 110 or a signal It output by the temporal interpolator 120 on the basis of the compared results as an interpolated signal Vout.

The operation of the device shown in FIG. 1 will now be described.

In FIG. 1, the interlaced image signal Vin is applied to the spatial interpolator 110, the temporal interpolator 120, and the correlator 130.

Meanwhile, it does not matter which spatial interpolating algorithm and temporal interpolating algorithm are used in the spatial interpolator 110 and the temporal interpolator 120, respectively, since the present invention relates to switching a spatially-interpolated progressive image signal (which is referred to as a "spatial interpolated signal" hereinafter) and a temporally-interpolated progressive image signal (which is referred to as a "temporal interpolated signal" hereinafter) on the basis of motion information and space information and outputting the selected signal.

The correlator 130 receives the interlaced signal Vin and detects the motion correlation DM, the vertical direction correlation DV, and the temporal-vertical correlation DT from the interlaced image signal Vin. Afterwards, the correlator 130 outputs the signals DM, DV, and DT.

The selector 140 compares the motion correlation DM, the vertical correlation DV, and the temporal-vertical correlation DT with predetermined constants TM, T1, and T2, respectively, and selects the signal Is output by the spatial interpolator 110 or the signal It output by the temporal interpolator 120, and outputs the selected signal Vout.

FIGS. 2A through 2D are detailed block diagrams of the correlator shown in FIG. 1.

In FIG. 2A, sample delays 201, 203, 204 and 206, and line delays 202 and 205, make up a first sample detector which detects samples w1 through w5. A field memory 210, sample delays 211 and 213, and line delay 212 make up a second sample detector which detects samples x1 and x2. Also, field memory 220, sample delays 221, 223, 224 and 226, and line delays 222 and 225, make up a third sample detector which detects samples v1 through v5.

FIG. 2B shows a motion correlator 230 which receives samples v1 through v5 and w1 through w5, and calculates and outputs the motion correlation DM. FIG. 2C shows a subtractor 241 and an absolute value circuit 242 which receive samples v1 through v5 and w1 through w5, and calculate and output the vertical correlation DV. Also, in FIG. 2D, adder 251 receives samples v3 and w3, and outputs a first added result. Adder 252 receives samples x1, x2 and outputs a second added result. A subtractor 253 subtracts the second added result from the first added result, to output a subtracted result. An absolute value circuit 254 receives the subtracted result from the subtractor 253 and calculates the absolute value as the temporal-vertical correlation DT.

Figure 3:
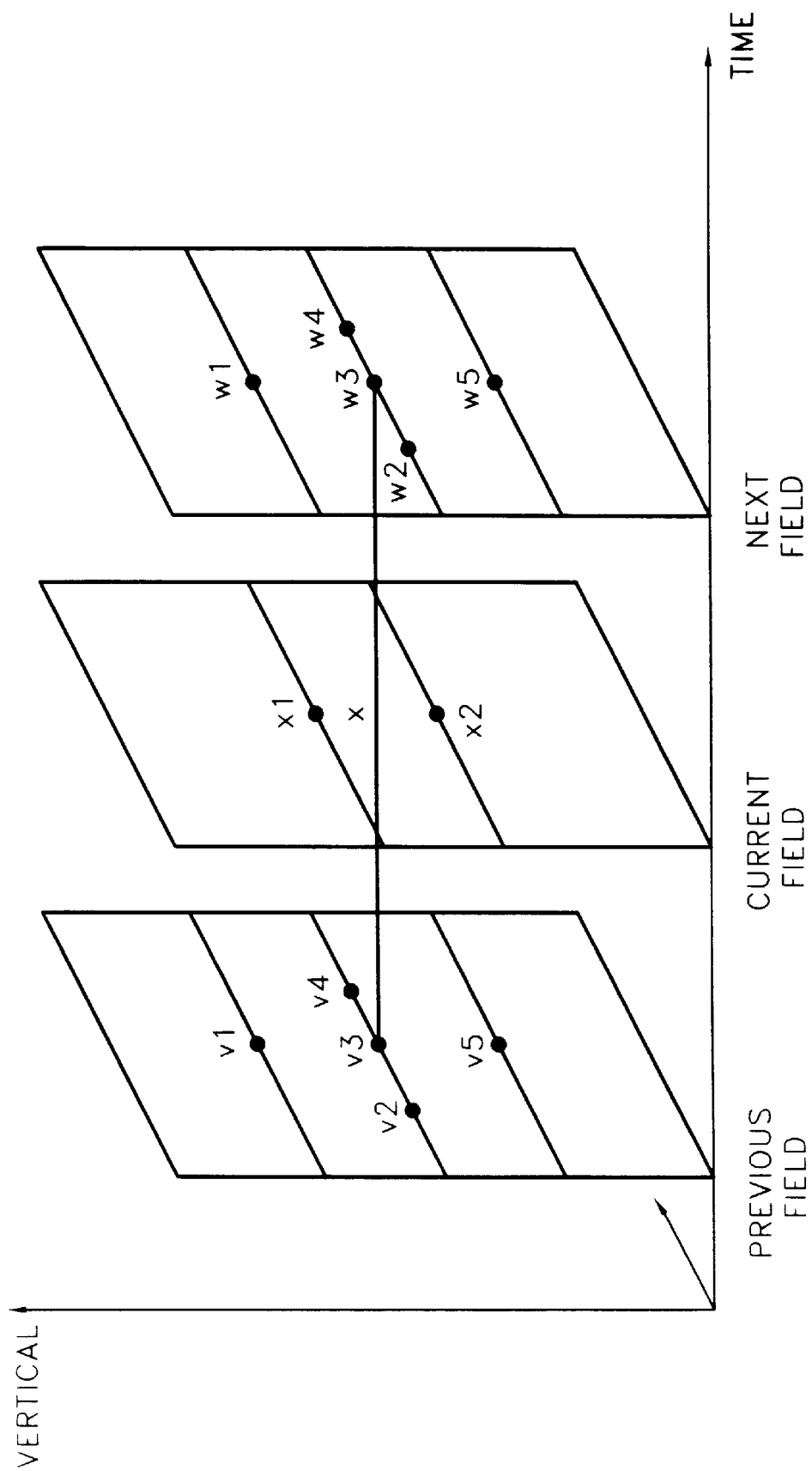
FIG. 3 illustrates a geometric relationship of samples used for switching spatial or temporal interpolated signals.

A geometric relationship between the samples shown in FIGS. 2B through 2D is illustrated in FIG. 3.

In FIG. 3, the sample "x" denotes the sample which is to be restored by an interpolation (which is referred to as "the present interpolation sample"). The sample "x1" denotes the sample of the same horizontal position with the present interpolation sample in the previous line. Also, the sample "x2" denotes the sample of the same horizontal position with the present interpolation sample in the next line.

The sample "v3" denotes the sample of the same position with the present interpolation sample in the previous field.

Samples "v2" and "v4" are the previous and the next sample of the sample v3, respectively. Also, the sample "v1" denotes the sample of the same horizontal position with the sample v3 in the previous line. The sample "v5" denotes the sample of the same horizontal position with the sample v3 in the next line.

Similarly, the sample "w3" denotes the sample of the same position with the present interpolation sample in the next field. Samples "w2" and "w4" are the previous and the next sample of the sample w3, respectively. Also, the sample "w1" denotes the sample of the same horizontal position with the sample w3 in the previous line. The sample "w5" denotes the sample of the same horizontal position with the sample w3 in the next line.

Meanwhile, if the current field is an odd numbered field, the previous field and the next field are the even numbered fields since the input signal is an input interlaced signal. Also, if the current field is an even numbered field, the previous field and the next field are the odd numbered fields.

Now, the operation of the device shown in FIGS. 2A through 2D will be described with reference to FIG. 3.

In FIG. 2A, the interlaced image signal Vin is input to the field memory 210, the sample delay 201 and the line delay 202.

The field memory 210 stores one field of the input image signal Vin and outputs an image signal which is delayed by one field period. The field memory 220 receives the delayed image signal from the field memory 210, stores one field of this delayed image signal, and outputs an image signal which is delayed by two field periods compared with the input original input signal Vin. The field memories 210 and 220 are first-in-first-out (FIFO) memories.

The sample delay 201 receives the interlaced image signal Vin, delays the signal by 1 sample period, and outputs the sample w5 of the next field shown in FIG. 3. The line delay 202 receives the input signal Vin, delays the signal by 1 horizontal line period, and outputs the sample w4 when the sample delay 201 outputs the sample w5. The sample delay 203 delays the signal output by the line delay 202 by 1 sample period, and outputs the sample signal w3. The sample delay 204 delays the signal output by the sample delay 203 by 1 sample period, and outputs the sample signal w2. The line delay 205 delays the signal output by the line delay 202 by 1 horizontal line period. The sample delay 206 delays the signal output by the line delay 205 by 1 sample period, and outputs the sample signal w1.

Meanwhile, the sample delay 211 delays further the signal which is delayed by 1 field period from the field memory 210 by 1 sample period, and outputs the sample x2. The line delay 212 delays the signal output by the field memory 210 by 1 horizontal line period. The sample delay 213 delays the signal output by the line delay 212 by 1 sample period, and outputs the sample signal x1.

The sample delay 221 delays further the signal which is delayed by 2 field periods from the field memory 220 by 1 sample period, and outputs the sample v5. The line delay 222 delays the signal output by the field memory 220 by 1 horizontal line period, and outputs the sample v4. The sample delay 223 delays the signal output by the line delay 222 by 1 sample period, and outputs the sample signal v3. The sample delay 224 delays the signal output by the sample delay 223 by 1 sample period, and outputs the sample signal v2. The line delay 225 delays the signal output by the line delay 222 by 1 horizontal line period. The sample delay 226 delays the signal output by the line delay 225 by 1 sample period, and outputs the sample signal v1.

The motion correlator 230 receives the samples v1 through v5 of the previous field and the samples w1 through w5 of the next field, calculates and outputs the motion correlation DM. At this time, the motion correlation DM output by the motion correlator 230 is calculated by a formula (1).

$$DM = \sum_{i=1}^{5} ai|vi - wi| \tag{1}$$

where, ai's are coefficients which were previously set.

The motion correlation DM is a measurement for estimating whether the motion is generated in the neighborhood of the position of the sample which is to be restored by an interpolation (geometrically, "x" in FIG. 3, which is the center of x1 and x2).

The subtractor 241 subtracts sample data x2 output by the sample delay 211 from the sample data x1 output by the sample delay 213, and outputs the subtracted result. Afterwards, the absolute value circuit 242 calculates the absolute value of the subtracted result to output the absolute value as the vertical correlation DV.

Thus, the vertical correlation DV can be expressed by the formula (2).

$$DV=|x1-x2| \tag{2}$$

The adder 251 adds the sample data v3 to the sample data w3. The adder 252 adds the sample data x1 to the sample data x2.

The subtractor 253 subtracts the signal (second added result) output by the adder 252 from the signal (first added result) output by the adder 251, and outputs the subtracted result. Afterwards, the absolute value circuit 254 calculates the absolute value of the subtracted result to output the absolute value as the temporal-vertical correlation DT.

Thus, the temporal-vertical correlation DT can be expressed by the formula (3).

$$DT=|(v3+w3)-(x1+x2)| \tag{3}$$

The motion correlation DM output by the motion correlator 230, the vertical correlation DV output by the absolute value circuit 242, and the temporal-vertical correlation DT output by the absolute value circuit 254 are input to the selector 140 shown in FIG. 1.

The operation of the selector 140 will be described with reference to the flow chart shown in FIG. 4.

Figure 4:
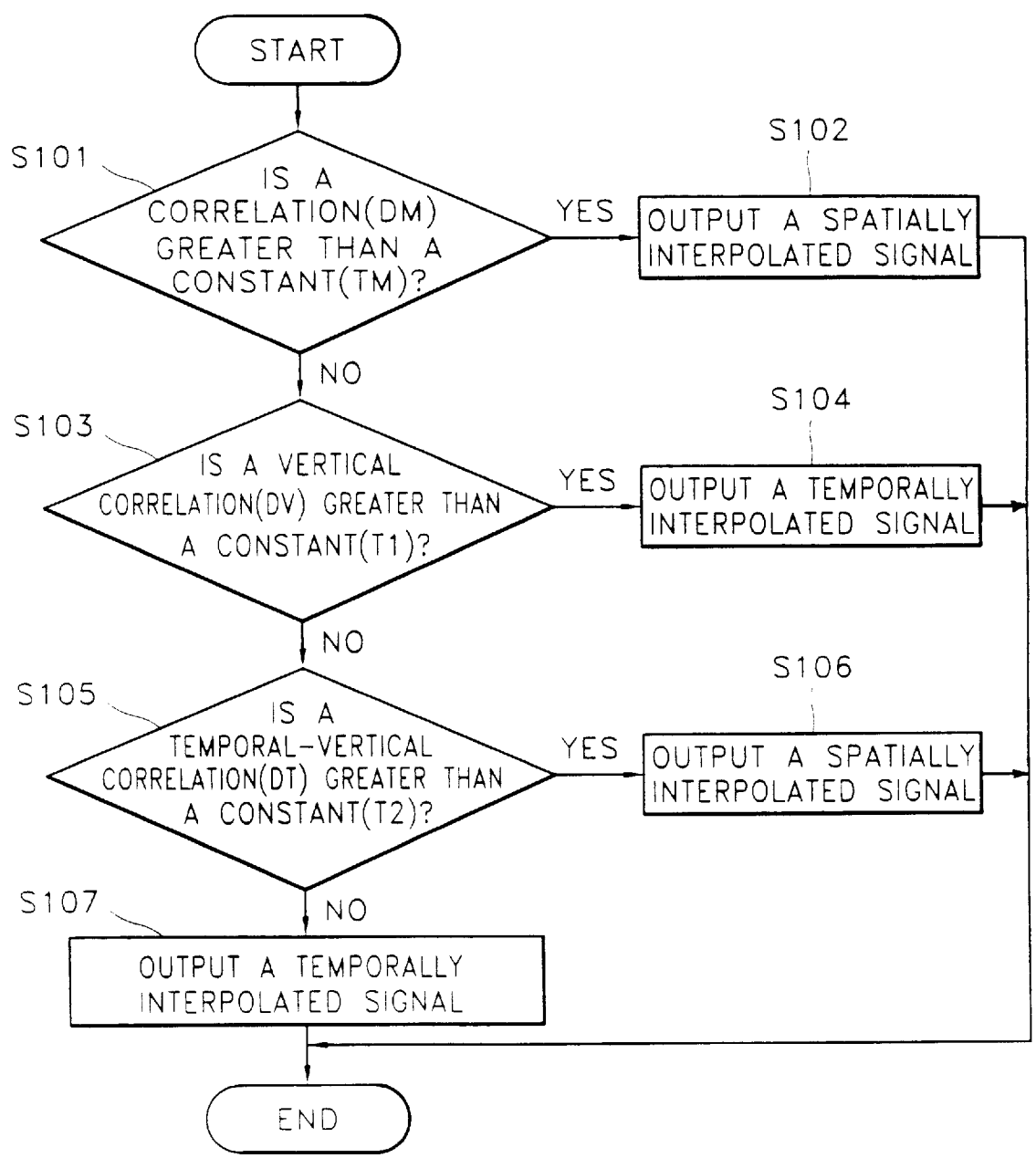
FIG. 4 is a flow chart describing a method for switching the spatial or the temporal interpolated signals according to output signals of the motion-space correlator in a selector shown in FIG. 1.

In FIG. 4, the selector 140 compares the motion correlation DM with the constant TM (step S101). If the motion correlation DM is greater than the constant TM, which signifies that a motion is generated, the selector 140 selects and outputs the spatially interpolated signal Is from the spatial interpolator 110 (step S102).

If the motion correlation DM is not greater than the motion constant TM in the step S101, the selector 140 compares the vertical correlation DV with the constant T1.(step S103). If the vertical correlation DV is greater than the constant T1, the selector 140 selects and outputs the temporal interpolated signal It from the temporal interpolator 120 (step S104).

Here, the reason that the vertical correlation DV is compared with the constant T1 when the motion correlation DM is not greater than the constant TM is because the artifact which may be generated by the wrong temporal interpolation is visually sensed differently depending on the size of the vertical correlation DV. When the vertical correlation DV is greater than the constant T1, the artifact generated due to the wrong temporal interpolation is not visually sensed easily since the image signal is less correlated in the vertical direction. Therefore, when the DM is not greater than the TM and the DV is greater than the T1, the signal It from the temporal interpolator 120 is selected and output by the selector 140 (step S104).

However, when the DM is smaller than the TM and the DV is smaller than the T1, the artifact generated due to the wrong temporal interpolation can be visually sensed more easily. Thus, the selector 140 selects and outputs the signal Is from the spatial interpolator 110 or the signal It from the temporal interpolator 120 depending on the temporal-vertical correlation DT which indicates the correlation between the temporal interpolation and the vertical interpolation.

Namely, the selector 140 compares the temporal-vertical correlation DT with the constant T2 when the motion correlation DM is not greater than the constant TM and the vertical correlation DV is not greater than the constant T1 (step S105). If the temporal-vertical correlation DT is greater than the constant T2, the selector 140 selects and outputs the signal Is from the spatial interpolator 110 to reduce the influence of the artifact since the correlation between the temporal interpolation and the vertical interpolation is small (step S106). Meanwhile, if the temporal-vertical correlation DT is not greater than the constant T2, the selector 140 selects and outputs the output signal It from the temporal interpolator 120 since the correlation between the temporal interpolation and the vertical interpolation is large (step S107).

As mentioned above, the interlaced-to-progressive conversion device and method according to the present invention interpolates the interlaced image signal temporally or spatially by using both the motion and spatial correlations, and enhances the reliability of the information about the motion and efficiently reduces the artifact.

What is claimed is:

1. An interlaced-to-progressive conversion device for converting an input interlaced image signal to a progressive image signal, comprising:

spatial interpolating means for spatially interpolating the input interlaced image signal and, in response, outputting a spatially interpolated signal;

temporal interpolating means for temporally interpolating the input interlaced image signal and, in response, outputting a temporally interpolated signal;

correlating means for receiving the input interlaced image signal and outputting a motion correlation, a vertical correlation, and a temporal-vertical correlation by using a predetermined number of sample data in a current field, a previous field and a next field; and selecting means for comparing the motion correlation, the vertical correlation, and the temporal-vertical correlation with respective predetermined constants and selecting between one of the spatially interpolated signal and the temporally interpolated signal according to the results of the comparisons to output the progressive image signal.

2. An interlaced-to-progressive conversion device as claimed in claim 1, wherein said correlating means comprises:

first detection means for detecting the motion correlation between a first sample group in a previous field which includes a first sample in a same position as a present interpolation sample, samples before the first sample and next to the first sample and samples in a same horizontal position in previous and next lines as the first sample, and a second sample group in a next field which includes a second sample in a same position as the present interpolation sample, samples before the second sample and next to the second sample and samples in a same horizontal position in the previous and next lines as the second sample;

second detection means for detecting the vertical correlation by determining a difference between samples in the same horizontal position in the previous and next lines of the current field as the present interpolation sample; and third detection means for detecting the temporal-vertical correlation by determining a difference between a first sum of the first sample and the second sample and a second sum of the samples in the same horizontal position in the previous and next lines of the current field.

3. An interlaced-to-progressive conversion device as claimed in claim 2, wherein said second detection means comprises:

a first subtractor for subtracting the sample in the same horizontal position in the next line of the present field from the sample in the same horizontal position in the previous line and, in response, outputting a first subtracted result; and a first absolute value circuit for determining a first absolute value of the first subtracted result as the vertical correlation.

4. An interlaced-to-progressive conversion device as claimed in claim 3, wherein said third detection means comprises:

a first adder for adding the first sample to the second sample, to generate a first added result;

a second adder for adding the samples in the same horizontal position in the previous and next lines of the current field, to generate a second added result;

a second subtractor for subtracting the second added result from the first added result and, in response, outputting a second subtracted result; and a second absolute value circuit for determining a second absolute value of the second subtracted result as the temporal-vertical correlation.

5. An interlaced-to-progressive conversion device as claimed in claim 2, further comprising:

first sample detection means for detecting the first sample group;

second sample detection means for detecting the samples in the same horizontal position in the previous and next lines of the current field as the present interpolation sample; and third sample detection means for detecting the second sample group.

6. An interlaced-to-progressive conversion device as claimed in claim 5, wherein said first sample detection means comprises:

a first sample delay for delaying the interlaced image signal by a sample period;

a first line delay delaying the interlaced image signal by a horizontal line period;

a second sample delay for delaying the output of said first line delay by the sample period;

a third sample delay for delaying the output of said second sample delay by the sample period;

a second line delay for delaying the output of said first line delay by the horizontal line period; and a fourth sample delay for delaying the output of said second line delay by the sample period.

7. An interlaced-to-progressive conversion device as claimed in claim 6, wherein said second sample detection means comprises:

a first field memory for inputting the interlaced image signal and delaying such signal by a field period;

a fifth sample delay for delaying the output of said first field memory by the sample period;

a third line delay for delaying the output of said first field memory by the horizontal line period; and a sixth sample delay for delaying the output of said third line delay by the sample period.

8. An interlaced-to-progressive conversion device as claimed in claim 7, wherein said third sample detection means comprises:

a second field memory for delaying the output of said first field memory by the field period;

a seventh sample delay for delaying the output of said second field memory by the sample period;

a fourth line delay for delaying the output of said second field memory by the horizontal line period;

an eighth sample delay for delaying the output of said fourth line delay by the sample period;

a ninth sample delay for delaying the output of said eighth sample delay by the sample period;

a fifth line delay for delaying the output of said fourth line delay by the horizontal line period; and a tenth sample delay for delaying the output of said fifth line delay by the sample period.

9. An interlaced-to-progressive conversion device as claimed in claim 2, wherein said third detection means comprises:

a first adder for adding the first sample to the second sample, to generate a first added result;

a second adder for adding the samples in the same horizontal position in the previous and next lines of the current field, to generate a second added result;

a subtractor for subtracting the second added result from the first added result and, in response, outputting a subtracted result; and a second absolute value circuit for determining an absolute value of the subtracted result as the temporal-vertical correlation.

10. An interlaced-to-progressive conversion device as claimed in claim 5, wherein said second sample detection means comprises:

a first field memory for delaying the interlaced image signal by a field period;

a first sample delay for delaying the output of said first field memory by a sample period;

a first line delay for delaying the output of said first field memory by a horizontal line period; and a second sample delay for delaying the output of said first line delay by the sample period.

11. An interlaced-to-progressive conversion device as claimed in claim 5, wherein:

said second sample detection means comprises a first field memory for delaying the interlaced image signal by a field period; and said third sample detection means comprises a second field memory for delaying the output of said first field memory by the field period;

a first sample delay for delaying the output of said second field memory by a sample period;

a first line delay for delaying the output of said second field memory by a horizontal line period;

a second sample delay for delaying the output of said first line delay by the sample period;

a third sample delay for delaying the output of said second sample delay by the sample period;

a second line delay for delaying the output of said first line delay by the horizontal line period; and a fourth sample delay for delaying the output of said second line delay by the sample period.

12. An interlaced-to-progressive conversion device as claimed in claim 1, wherein said selecting means selects and outputs the spatially interpolated signal if the motion correlation value is greater than a first predetermined constant.

13. An interlaced-to-progressive conversion device as claimed in claim 12, wherein said selecting means selects and outputs the temporally interpolated signal if the motion correlation value is not greater than the first predetermined constant and the vertical correlation value is greater than a second predetermined constant.

14. An interlaced-to-progressive conversion device as claimed in claim 13, wherein said selecting means selects and outputs the spatially interpolated signal if the motion correlation value is not greater than the first predetermined constant and the vertical correlation value is not greater than the second predetermined constant and the detected temporal-vertical correlation value is greater than a third predetermined constant.

15. An interlaced-to-progressive conversion device as claimed in claim 14, wherein said selecting means selects and outputs the temporally interpolated signal if the motion correlation value is not greater than the first predetermined constant and the vertical correlation value is not greater than the second predetermined constant and the temporal-vertical correlation value is not greater than the third predetermined constant.

16. An interlaced-to-progressive conversion device as claimed in claim 2, wherein:

the first sample in the same position as a present interpolation sample is represented by v3, the samples before the first sample and next to the first sample are represented by v2 and v4, respectively, and the samples in the same horizontal position in the previous and next lines as the first sample are represented by v1 and v5, respectively, the second sample in the same position as the present interpolation sample is represented by w3, the samples before the second sample and next to the second sample are represented by w2 and w4, respectively, and the samples in the same horizontal position in the previous and next lines as the second sample are represented by w1 and w5, respectively; and the motion correlation is determined by $$DM = \sum_{i=1}^{5} ai|vi - wi| \qquad (1)$$

where, ai's are predetermined coefficients.

17. An interlaced-to-progressive conversion method for converting an input interlaced image signal to a progressive image signal, comprising the steps of:

(a) spatially interpolating the input interlaced image signal and outputting a spatially interpolated signal;

(b) temporally interpolating the input interlaced image signal and outputting a temporally interpolated signal;

(c) detecting a motion correlation, a vertical correlation, and a temporal-vertical correlation from the input interlaced image signal;

(d) selecting the spatially interpolated signal if the detected motion correlation value is greater than a first predetermined constant;

(e) selecting the temporally interpolated signal if the motion correlation value is not greater than the first predetermined constant and the detected vertical correlation value is greater than a second predetermined constant;

(f) selecting the spatially interpolated signal if the motion correlation value is not greater than the first predetermined constant, the vertical correlation value is not greater than the second predetermined constant, and the detected temporal-vertical correlation value is greater than a third predetermined constant; and (g) selecting the temporally interpolated signal if the motion correlation value is not greater than the first predetermined constant, the vertical correlation value is not greater than the second predetermined constant, and the temporal-vertical correlation value is not greater than the third predetermined constant.

18. An interlaced-to-progressive conversion method as claimed in claim 17, wherein said step (c) comprises the steps of:

(c1) detecting the motion correlation between a first sample group in a previous field which includes a first sample in the same position as a present interpolation sample, samples before the first sample and next to the first sample and samples in a same horizontal position in previous and next lines as the first sample, and a second sample group in a next field which includes a second sample in a same position as the present interpolation sample, samples before the second sample and next to the second sample and samples in a same horizontal position in previous and next lines as the second sample;

(c2) detecting the vertical correlation by determining a first difference between samples in the same horizontal position in the previous and next lines of a current field as the present interpolation sample; and (c3) detecting the temporal-vertical correlation by determining a second difference between a first sum of the first sample and the second sample and a second sum of samples in the same horizontal position in the previous and next lines of the current field.

19. An interlaced-to-progressive conversion method as claimed in claim 17, wherein:

said step (c2) further comprises determining a first absolute value of the first difference as the vertical correlation; and said step (c3) further comprises determining a second absolute value of second difference as the temporal-vertical correlation.

20. An interlaced-to-progressive conversion device for converting an input interlaced image signal to a progressive image signal, comprising:

spatial interpolating means for spatially interpolating the input interlaced image signal and, in response, outputting a spatially interpolated signal;

temporal interpolating means for temporally interpolating the input interlaced image signal and, in response, outputting a temporally interpolated signal;

correlating means for receiving the input interlaced image signal and outputting a motion correlation, a vertical correlation, and a temporal-vertical correlation of the input interlaced image signals; and selecting means for selecting one of the spatially interpolated signal and the temporally interpolated signal as the progressive image signal based upon values of the motion correlation, the vertical correlation, and the temporal-vertical correlation.

* * * * *